United States Patent [19]
Johnson et al.

[11] 3,878,378
[45] Apr. 15, 1975

[54] DATA PROCESSOR FOR MULTISTATION PHOTOMETERS

[75] Inventors: Wayne F. Johnson, Loudon; Richard A. Mathis, Knoxville, both of Tenn.

[73] Assignee: The United States of America as represented by the United States Atomic Energy Commission, Washington, D.C.

[22] Filed: Oct. 31, 1973

[21] Appl. No.: 411,553

[52] U.S. Cl............................. 235/151.35; 356/246
[51] Int. Cl. ............................................. G01n 1/10
[58] Field of Search ......... 340/172.5; 250/206, 214, 250/565; 356/205, 246; 235/151.35

[56] References Cited
UNITED STATES PATENTS

| | | |
|---|---|---|
| 3,531,209 | 9/1970 | Williamson et al............. 250/214 R |
| 3,656,116 | 4/1972 | Jansen ............................ 340/172.5 |
| 3,663,110 | 5/1972 | Rising.................................. 250/206 |
| 3,703,336 | 11/1972 | Rosse et al............................ 356/39 |
| 3,748,044 | 7/1973 | Liston................................. 356/246 |

Primary Examiner—Gareth D. Shaw
Assistant Examiner—Mark E. Nusbaum
Attorney, Agent, or Firm—John A. Horan; David S. Zachry; Louis M. Deckelmann

[57] ABSTRACT

A digital data processor for use with a miniature photometric fast analyzer is provided. The data processor is designed to accept GeMSAEC transmittance values, convert them to absorbance values, and provide them to a mechanical printer. The processor, as a singular purpose digital logic system, is useful as an alternative to a computer-controlled analyzer.

2 Claims, 1 Drawing Figure

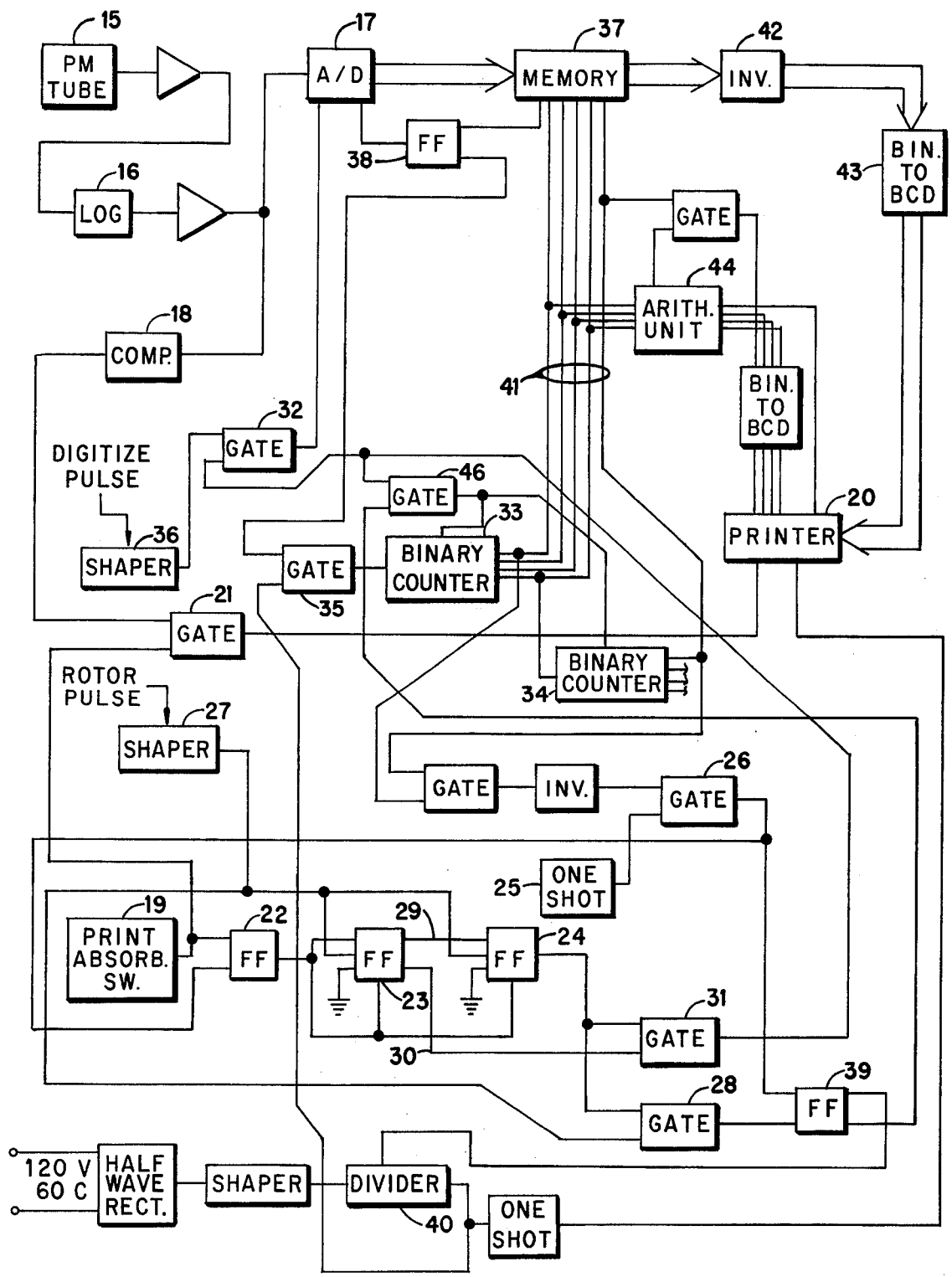

3,878,378

DATA PROCESSOR FOR MULTISTATION PHOTOMETERS

BACKGROUND OF THE INVENTION

This invention was made in the course of, or under, a contract with the U.S. Atomic Energy Commission.

A rotary-type photometric fast analyzer (GeMSAEC) is described in U.S. Pat. No. 3,555,284, issued Jan. 12, 1971, and a miniature version of such an analyzer is described in a U.S. application, Ser. No. 295,780, filed on Oct. 6, 1972, both having a common assignee with the present application. The present invention is useful with either of these analyzers and particularly with the miniature analyzer for processing the data therefrom.

A digital computer is used in many fast analyzer applications for data gathering and processing. Installations that have a number of analyzers would particularly benefit from the computer-controlled automatic systems. For example, see U.S. Pat. No. 3,576,441, issued Apr. 27, 1971, and U.S. Pat. No. 3,656,116, issued Apr. 11, 1972, both having a common assignee with the present application. However, in installations having a portable analyzer, a non-computer-operated system is needed and would be more desirable. The present invention was conceived to meet this need in a manner to be described hereinbelow.

SUMMARY OF THE INVENTION

It is the object of the present invention to provide a singular purpose digital logic system for processing the data from a rotary-type photometric analyzer and presenting it in printed form.

The above object has been accomplished in the present invention by providing a data processor system in which the inputs thereto are the cuvette data values ("transmittance pulses") that are received from the photomultiplier tube of an analyzer, the individual cuvette pulses (here termed "digitize pulses"), and the "rotor pulse" that is given once with each revolution of the analyzer rotor. The digitize pulses are provided such that they occur in the center of the transmittance pulses. It should be noted that the digitize pulses are obtained from slits in the analyzer rotor (one pulse for each of the rotor cuvettes). Each slit is in radial alignment with a corresponding cuvette. The data processor converts the input transmittance values to absorbance values and then provides them to a mechanical printer in a manner to be described hereinbelow.

It should be understood that the rotor of a photometric analyzer such as described in the abovementioned U.S. Pat. No. 3,555,284 or the abovementioned application contains a plurality of cuvette chambers each containing a sample to be analyzed such that the amount of light transmitted through respective cuvette chambers as the analyzer rotor is rotated is detected by the photomultiplier tube of the analyzer to provide a plurality of sequential output pulses therefrom, which are the transmittance pulses referred to hereinabove.

BRIEF DESCRIPTION OF THE DRAWING

The single FIGURE in the drawing is a schematic circuit diagram of the singular purpose digital logic system of the present invention for accomplishing the above object.

DESCRIPTION OF THE PREFERRED EMBODIMENT

Referring to the single FIGURE in the drawing, the photomultiplier tube 15 is associated with a photometric analyzer such as described in the above-mentioned U.S. Pat. No. 3,555,284, or the above-mentioned application, Ser. No. 295,780. The transmittance values received from the photomultiplier tube 15 are changed to absorbance values by the log converter 16 and these data are provided jointly to an analog-to-digital converter (A/D) 17 and to a comparator 18. The log converter 16 may be a Teledyne Phillbrick Model 4351, for example. The respective absorbance value is simply equal to $Log_{10}$ of the respective transmittance value. The comparator 18 functions as a device for providing a signal in response to an abnormal condition in a manner to be described hereinbelow. With the photomultiplier tube voltage controller installed in the analyzer, the water blank or reference signal is automatically set to approximately 10 volts and the other signals are desired to be less than 10 volts in a manner as described in U.S. application Ser. No. 289,906, filed Sept. 18, 1972, and having a common assignee with the present application. The comparator 18 tests all data signals for this 10 -volt maximum. It is possible that a thumbprint or small smudge on the water blank cuvette could result in too high a photomultiplier voltage for the other cuvettes. The occurence of such an abnormal condition is provided by the comparator 18 in a manner to be described hereinbelow.

With the analyzer rotor at operating speed and the various reactions taking place in the rotor cuvettes containing the samples to be analyzed the data processor in the drawing provides the data values for all cuvettes each time the print absorbance button, or switch, 19 is pressed. This operation is as follows: The pressing of the print absorbance switch 19 jointly permits the comparator 18 to transmit its signal to the printer 20 via the gate 21, and enables the flipflops 23 and 24 via the flipflop 22. The printer 20 may be a PPM, Inc. Model PP-10 A, for example. It should be noted that the flipflop 22 was enabled one second after power was turned on the circuit by means of the timer 25 via the gate 26. When the rotor pulse first occurs, the pulse shaper 27 provides it jointly to the gate 28 and as a common clock pulse to the flipflops 23 and 24. The pulse shaper 27 may be a Motorola Model MC-426P, for example. It should be noted that the rotor pulse occurs once for each complete revolution of the photometer analyzer rotor. Both outputs 29 and 30 of the flipflop 23 change state at the occurence of the rotor pulse after the switch 19 has been pressed. The output 29 enables the flipflop 24, and the output 30 provides a qualifying input to the gate 32 via the gate 31.

The circuit is now ready to begin accepting data. With the gate 32 enabled, the next occurring digitize pulse (No. 1 cuvette) triggers the A/D converter 17 "on" via the pulse shaper 36 and gate 32. The pulse shaper 36 may also be a Motorola Model MC-426P, for example. The absorbance value for the first cuvette is present at that instant on the A/D 17 input and is written into the bipolar scratch pad memory unit 37. The memory unit 37 may be a Signetics Corporation Model 8225, for example. With the trailing edge of the first digitize pulse, the A/D trigger is removed. An end-of-conversion pulse is given to the flipflop 38 when the A/D converter has digitized the data. This pulse enables the memory unit 37 to store the data via the flipflop 38 and also advances the binary counter 33 by one increment.

The next digitize pulse (No. 2 cuvette) repeats the A/D function for the second cuvette absorbance value and causes it to be stored in the memory unit 37 while advancing the counter 33 a second time. Thus, this procedure is repeated for each subsequent digitize pulse until all the cuvette absorbance values are stored in the memory unit 37. It should be noted that there are seventeen cuvette absorbance values to be stored in the memory unit 37 such that it was necessary to provide a second binary counter 34 since the binary counter 33 is filled when the first sixteen cuvette absorbance values have been stored in the unit 37. The address for the memory unit 37 is provided by the output leads 41 of the counters 33 and 34. With the completion of the revolution of the rotor, all seventeen cuvette values have been stored and the rotor pulse is again present. This rotor pulse causes flipflop 24 to change state and jointly disables the gate 32 and resets the counters 33 and 34 via gate 31 and gate 46.

Nothing further happens until the next (third) rotor pulse. With it occurence, the gate 28 passes the rotor pulse to the flipflop 39 causing it to change state and enable a divide-by-thirty counter 40. The counter 40 may be a Texas Instruments Company Model SN-7493N, for example. The divider 40 provides a 2 Hz pulse train that is utilized as successive print signals to the printer 20 and to the counters 33 and 34 via gate 35 to advance them. The counter 33 is first sequentially advanced until full and then the counter 34 is advanced. Each pulse from the divider 40 advances the counter 33 by one increment for 16 successive increments and finally the counter 34 is advanced by one increment for the last cuvette stored value. With each respective advance of the counter 33 and subsequently the counter 34, the memory 37 is caused, via the leads 41, to sequentially read out the stored data values through an inverter 42 and a binary-to-binary coded decimal (BCD) converter 43 to the printer 20. When all of the seventeen cuvette values have been processed and printed by the printer 20, the logic devices are reset via a final signal from the counter 34 to the gate 26 wherein the logic devices are reset to their initial conditions and the data processor is ready for the switch 19 to be pressed again for a subsequent data processing operation.

An eight-character printer was used with the present invention in which two characters were used for the cuvette numbers, five characters were for the absorbance data, and one character was left blank. An arithmetic unit 44 was wired to take its input and add 1 to it so that the printer would print for the first cuvette identifying number the number 01 and successive numbers up to 17 to correspond to the printed data values. The unused character space will print 7's alongside the data values in the event the comparator 18 senses an abnormal voltage level on the input to the A/D converter 17. This feature notifies the operator of such an abnormal condition. The speed of the data processor, described above, is essentially the speed of the print signals, about two prints per second, or 10 seconds total time. This makes the analysis of rate reactions possible. The print command can be given by a repeating timer and a modified printer could be provided to produce the absorbance values in chart form. Also, since the data given to the printer is in a form that can be readily transmitted over telephone lines, there exists the possibility of telemetering the data processing results if such is desired.

The data processor and printer together are of smaller physical size than the miniature photometric analyzer mentioned hereinabove, so that a complete facility may be constructed that would be the size of a large suitcase. A mobile facility as well as a bedside and/or emergency room application is thus possible.

This invention has been described by way of illustration rather than by limitation and it should be apparent that it is equally applicable in fields other than those described.

What is claimed is:

1. In a rotary photometric analyzer device including a plurality of cuvettes positioned in the rotor of said device with each of said cuvettes containing a respective sample to be analyzed, said rotor adapted to provide a rotor pulse for each complete revolution of said rotor and a digitized pulse for each cuvette position of said rotor during rotation thereof, and a photomultiplier tube positioned to receive respective transmittance values of the amount of light transmitted through each of said cuvettes as the rotor of said device is rotated, said tube providing a plurality of sequential output signals therefrom as a function of said transmittance values, the improvement comprising a digital logic system coupled to the output of said photomultiplier tube for processing said output signals received therefrom, said logic system comprising a log converter coupled to the output of said photomultiplier tube, a bipolar scratch pad memory unit, an analog-to-digital converter coupled between the output of said log converter and the input to said memory unit to provide digital signals for sequential storage into said memory unit, a print switch, a first flipflop coupled to said print switch, a timer coupled through a first gate to said first flipflop for enablement thereof, a second flipflop and a third flipflop coupled to the output of said first flipflop, a first pulse shaper for receiving said rotor pulse from said rotor and providing a common clock pulse to said second and third flipflops, a second pulse shaper for receiving said digitized pulses from said cuvette rotor positions, a second gate coupled between said second pulse shaper and said analog-to-digital converter, said second pulse shaper providing gating pulses to said second gate which in turn triggers said converter, a fourth flipflop coupled between said analog-to-digital converter and said memory unit, a binary counter coupled by means of a third gate to the output of said fourth flipflop, the output of said counter coupled to said memory unit to provide the address advance thereto, a fourth gate coupled to the output of said third flipflop, the output of said fourth gate coupled to said second gate for providing a qualifying input thereto, whereby when said print switch is closed and a first rotor pulse is received said digital signals are sequentially stored in said memory unit and said counter is sequentially advanced and upon recipt of a second rotor pulse said counter is reset by means of a fifth gate coupled to the output of said fourth gate while at the same time said fourth gate effects disablement of said second gate, said system further including a printer, an inverter coupled to the output of said memory unit, and a binary-to-binary coded decimal converter coupled between said inverter and said printer, a sixth gate, a fifth flipflop, and a divide-by-thirty counter, said sixth gate coupled to the output of said first pulse shaper and to the output of said third flipflop, said fifth flipflop coupled to the output of said sixth gate and to the output of said first gate, the output of said fifth flipflop coupled to said divide-by-thirty counter, said last-named counter coupled by means of said third gate to said binary counter to again sequentially advance it, said last-named counter also coupled to said printer to provide successive print signals thereto, whereby upon receipt of a third rotor pulse by first pulse shaper said signals stored in said memory unit are sequentially read out therefrom and printed by said printer, after which said system is restored to its initial condition by means of a final signal from said binary counter to said first gate.

2. The system set forth in claim 1, wherein said system further includes a comparator coupled to the output of said log converter, and a seventh gate coupled to the output of said comparator, said seventh gate also being coupled to said print switch, the output of said seventh gate coupled to said printer, whereby if any of the signals being presented to said analog-to-digital converter exceeds a predetermined fixed voltage level said printer will print this abnormal condition.

* * * * *